United States Patent
Ionescu et al.

(10) Patent No.: US 10,614,221 B2
(45) Date of Patent: Apr. 7, 2020

(54) METHOD AND APPARATUS FOR SECURITY TESTING OF APPLICATION FLOWS THAT CANNOT BE AUTOMATED THROUGH HTTP REPLAY

(71) Applicant: INTERNATIONAL BUSINESS MACHINES CORPORATION, Armonk, NY (US)

(72) Inventors: Paul Ionescu, Ontario (CA); Iosif V. Onut, Ottawa (CA); Shahar Sperling, Herzliya (IL); Omer Tripp, Campbell, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 342 days.

(21) Appl. No.: 15/353,039

(22) Filed: Nov. 16, 2016

(65) Prior Publication Data
US 2018/0137286 A1    May 17, 2018

(51) Int. Cl.
G06F 21/57    (2013.01)
G06F 11/36    (2006.01)

(52) U.S. Cl.
CPC ........ *G06F 21/577* (2013.01); *G06F 11/3664* (2013.01); *G06F 11/3684* (2013.01); *G06F 11/3688* (2013.01); *G06F 2221/033* (2013.01)

(58) Field of Classification Search
None
See application file for complete search history.

(56) References Cited

U.S. PATENT DOCUMENTS 7,330,887 B1    2/2008    Dharmadhikari
8,869,279 B2    10/2014   Shulman et al.
(Continued)

FOREIGN PATENT DOCUMENTS

CA    2789909 A1    3/2014
WO    2012166113 A1    12/2012

OTHER PUBLICATIONS

Chien-Hung Liu, "Data flow analysis and testing of JSP-based Web applications,"ScienceDirect, Information and Software Technology 48, 2006, pp. 1-3.
(Continued)

*Primary Examiner* — Henry Tsang
(74) *Attorney, Agent, or Firm* — Cantor Colburn LLP; Jeffrey S LaBaw

(57) ABSTRACT

Technical solutions are described for testing a computer program product. An example method includes intercepting an instance of a request sent for execution by the computer program product, the request being one from a plurality of requests in a sequential flow. The method also includes storing a unique identifier for the request, and initializing a current test request index in response to the request being a first instance of a starting request of the sequential flow. The method also includes selecting a test task from a set of test tasks corresponding to the request in response to determining that the request is a current test-request based on an index of the request matching the current test request index. The method also includes modifying the instance of the request according to the selected test task, and sending the modified instance of the request to the computer program product for execution.

17 Claims, 6 Drawing Sheets

(56) References Cited

U.S. PATENT DOCUMENTS

| | | |
|---|---|---|
| 8,893,282 B2 | 11/2014 | Pennington et al. |
| 2003/0159063 A1* | 8/2003 | Apfelbaum ........... G06F 21/577 726/25 |
| 2007/0174917 A1* | 7/2007 | Guruswamy ......... G06F 21/577 726/25 |
| 2009/0083854 A1* | 3/2009 | Bozanich ............. G06F 21/577 726/23 |
| 2009/0119777 A1* | 5/2009 | Jeon ..................... G06F 21/577 726/25 |
| 2013/0097486 A1 | 4/2013 | Miller |
| 2014/0075563 A1* | 3/2014 | Simpson .............. G06F 21/577 726/25 |
| 2017/0272352 A1* | 9/2017 | Badea .................... H04L 43/50 |

OTHER PUBLICATIONS

Wurzinger, et al., "SWAP: Mitigating XSS Attacks Using a Reverse Proxy," Proceeding IWSESS '09 Proceedings of the 2009 ICSE Workshop on Software Engineering for Secure Systems, 2009, pp. 1-7.

* cited by examiner

METHOD AND APPARATUS FOR SECURITY TESTING OF APPLICATION FLOWS THAT CANNOT BE AUTOMATED THROUGH HTTP REPLAY

BACKGROUND

The present application relates to computer technology, and more specifically, to the testing security of a computer program product.

Nowadays, businesses maintain an online presence to conduct commerce and business operations using the Internet. The businesses have to maintain one or more secure webpages to ensure the integrity of online data and continue to function properly on the Internet. Consequently, webpage security is validated regularly. Manual penetration testing is one technique of security validation. In manual penetration testing, an attack from a malicious source is simulated on a web page. An attack typically includes inserting malicious code into communications with the web page. A user may manually analyze the web site for vulnerabilities that have been exposed to the attack.

However, web pages can be quite large and extensive, and thus vulnerabilities can be missed during manual analysis. Additionally, web site administrators may be unaware of applications residing on one or more web pages, and vulnerabilities related to those applications may be missed. Further, a process, such as creating accounts, generating quotations, and other such activities, can be difficult to test because of sequential operations that depend on the specificity of the process, and source code may not be fully covered by a manual attack, allowing for more missed vulnerabilities.

SUMMARY

According to one or more embodiments, a computer implemented method for testing a computer program product includes intercepting an instance of a request sent for execution by the computer program product, the request being one from a plurality of requests in a sequential flow. The computer implemented method also includes in response to the request being a first instance of a starting request of the sequential flow, storing a unique identifier for the request, and initializing a current test request index. The computer implemented method also includes in response to determining that the request is a current test-request based on an index of the request matching the current test request index, selecting a test task from a set of test tasks corresponding to the request. The computer implemented method also includes modifying the instance of the request according to the selected test task. The computer implemented method also includes sending the modified instance of the request to the computer program product for execution.

According to one or more embodiments, a system for testing a computer program product, the system includes a memory, and a processor coupled with the memory. The processor intercepts an instance of a request sent for execution by the computer program product, the request being one from a plurality of requests in a sequential flow. The processor, in response to the request being a first instance of a starting request of the sequential flow, stores a unique identifier for the request, and initializes a current test request index. The processor, in response to a determination that the request is a current test-request based on an index of the request matching the current test request index, selects a test task from a set of test tasks corresponding to the request. The processor modifies the instance of the request according to the selected test task. The processor also sends the modified instance of the request to the computer program product for execution.

According to one or more embodiments, a computer program product for testing a target system includes a computer readable storage medium. The computer readable storage medium includes computer executable instructions to intercept an instance of a request sent for execution by the computer program product, the request being one from a plurality of requests in a sequential flow. The computer readable storage medium also includes computer executable instructions to, in response to the request being a first instance of a starting request of the sequential flow, store a unique identifier for the request, and initialize a current test request index. The computer readable storage medium also includes computer executable instructions to, in response to a determination that the request is a current test-request based on an index of the request matching the current test request index, select a test task from a set of test tasks corresponding to the request. The computer readable storage medium also includes computer executable instructions to modify the instance of the request according to the selected test task. The computer readable storage medium also includes computer executable instructions to send the modified instance of the request to the computer program product for execution.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
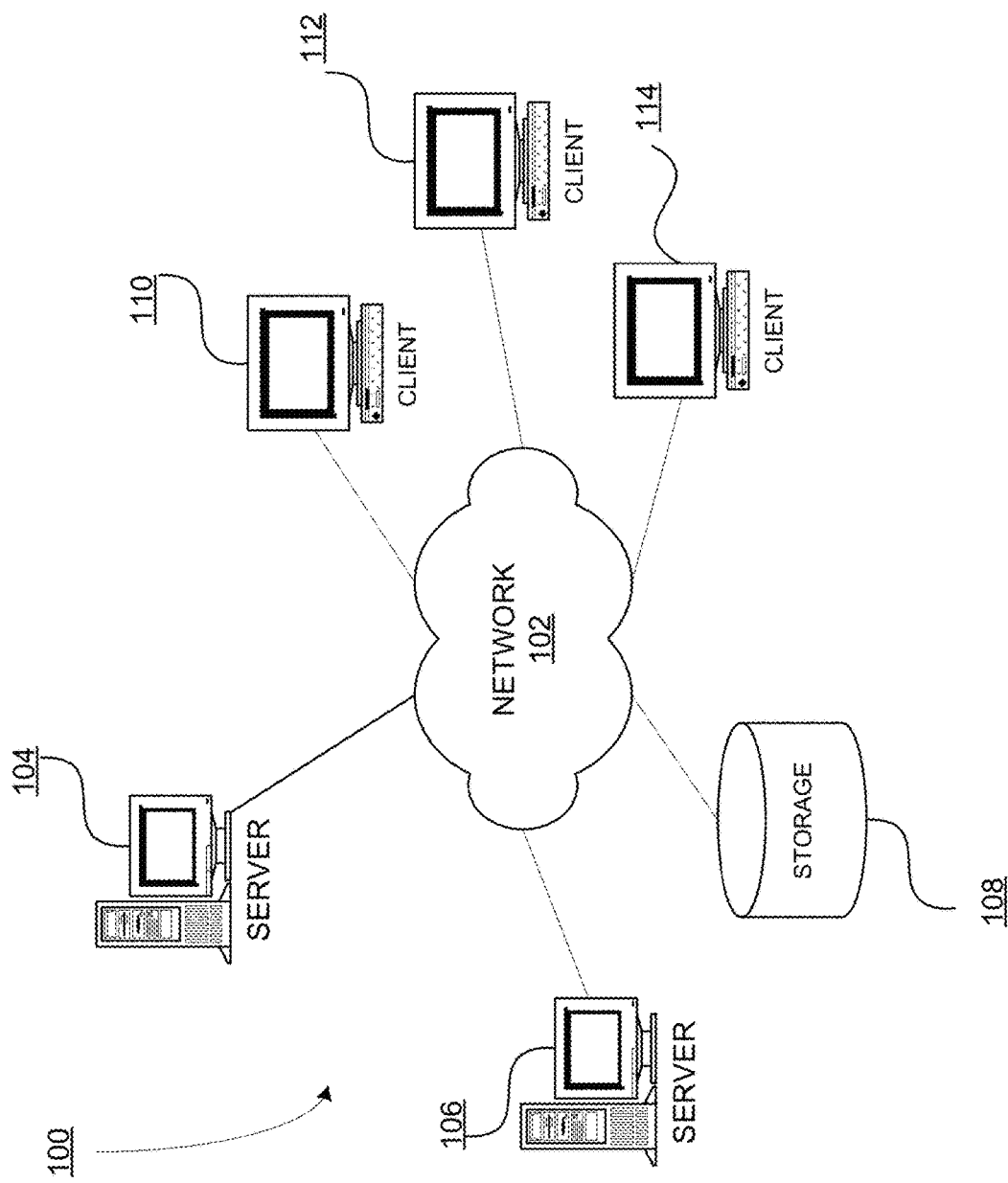
FIG. 1 depicts a pictorial representation of a network of data processing systems in accordance with one or more embodiments.

Described herein are technical solutions for testing security of a computer program product. A computer program product may include a software application (referred to as application henceforth), such as a desktop application, a mobile application, a webpage, or any other type of application that includes one or more computer executable instructions. As such, the technical solutions are rooted in and/or tied to computer technology in order to overcome a problem specifically arising in the realm of computers, specifically security of computer program products. The examples described herein use webpages and web applications to describe the workings of the technical solutions, however a person skilled in the art would be able to apply, based on the description herein, the examples for testing security of other types of computer program products.

Typically, a transport level attack mechanism may be used to test for vulnerabilities in a web application. The transport level attacks may be created by enclosing various parameters within a web request, including attack code. The request may be sent to the server for processing. A vulnerability may be found, based on the attack, if a server that hosts the web application responds to the request in a manner expected when such a vulnerability is present. Alternatively, or in addition, a crawl and audit technique may also be used to discover vulnerabilities and is typically used by working statically with each link resulting in a request to and a response from the server. Additionally, the crawl and audit technique is performed automatically, without user interaction or the aid of a web browser. User traffic is not recorded, therefore no authentication data is available to access web applications.

Further, web application security testing is conducted by manipulating playback using hypertext transfer protocol (HTTP) requests. However, applications that rely upon combinations of complex session variables make such HTTP playback difficult. Further, one or more applications use frameworks that generate content of the application dynamically, such as a content management system (CMS).

For example, consider a scenario where the web application, provides a sequential flow to a user, such as for creating an account, requesting a quote, or any other process in which the user provides specific input data and makes specific selections. For example, the sequential flow may depend on the user selecting a specific button on the web application. For example, say the web application displays two buttons, button A and button B, with corresponding computer executable instructions in hypertext markup language (HTML) as shown in Table 1. It is understood that although the examples described herein use HTTP requests and HTML for the computer executable instructions, in other examples the computer executable instructions may use other programming languages.

TABLE 1

```
<input type=button value="Button A"
onclick=submitForm('navigate','USdHzPTwimh3qphZzhXPSw==')>
<input type=button value="Button B"
onclick=submitForm('navigate','FNYH6dIrWWGY7WymbmGYeQ==')>
```

Accordingly, in this example, for a HTTP playback, such as by using a tool like SELENIUM™, or by using a scripting tool such as SIKULI™ used for HTTP playback, or any other automated HTTP playback technique, for playback of response to the button A, the HTTP request has to resend information illustrated in Table 2.

TABLE 2

```
POST /navigate HTTP/1.1
Host: site.com
target=USdHzPTwimh3qphZzhXPSw==
```

However, if the value of the target parameter changes from time to time the automated HTTP replay is no longer possible unless the playback tool can track the value of the target parameter across sessions. Alternatively, the automated tool may backtrack through the sequential flow of previous requests to re-initialize the value for the target parameter. However, in the case of multiple parameters being used, such as the example illustrated in Table 3, the backtracking can get exponentially difficult, thus leading to inefficiencies. It is understood that although Table 3 illustrates an example using 2 parameters (target, and action), in other cases more than 2 parameters may be used.

TABLE 3

```
POST /navigate HTTP/1.1
Host: site.com
target=USdHzPTwimh3qphZzhXPSw==&action=Eb5IIF2FrRDaWmqjN+s3Tw==
```

Accordingly, the technical solutions described herein address the above described technical problem. The technical solutions automatically identify parameters being used in the application requests and test each and every parameter as per a predetermined testing policy.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
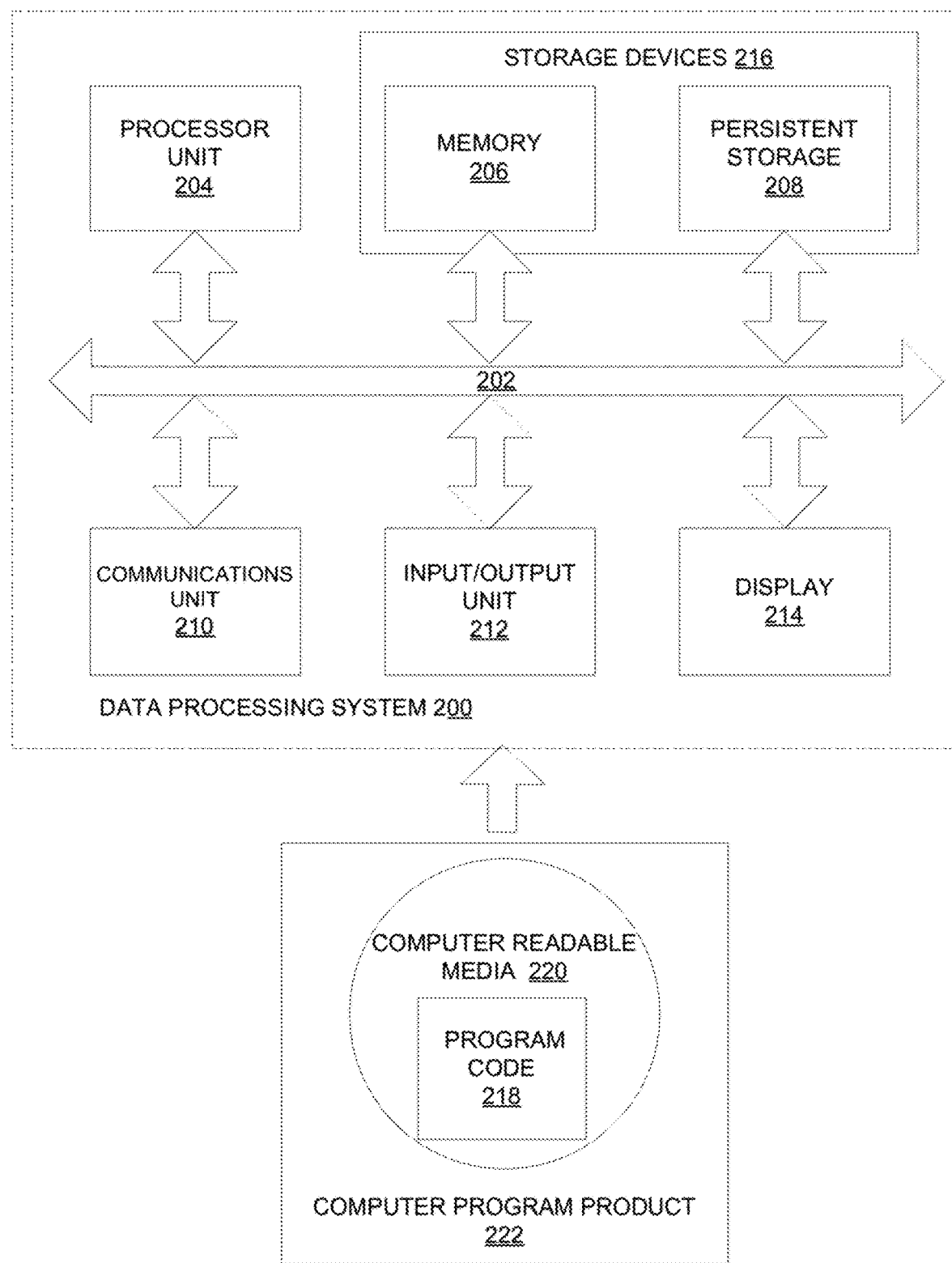
FIG. 2 illustrates a block diagram of an exemplary data processing system in accordance with one or more embodiments.

With reference to FIG. 2, a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which the main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer-readable program code that may be read and executed by a processor in processor unit 204. The program code in the different embodiments may be embodied on different physical or tangible computer-readable storage media, such as memory 206 or persistent storage 208.

Program code 218 is located in a functional form on computer-readable storage media 220 that is selectively removable and may be loaded onto or transferred to data processing system 200 for execution by processor unit 204. Program code 218 and computer-readable storage media 220 form computer program product 222 in these examples. In one example, computer-readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable storage media 220 also may take the form of a persistent storage, such as a hard drive, a thumb drive, or a flash memory that is connected to data processing system 200. The tangible form of computer-readable storage media 220 is also referred to as computer recordable storage media. In some instances, computer-readable storage media 220 may not be removable.

Alternatively, program code 218 may be transferred to data processing system 200 from computer-readable storage media 220 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer-readable storage medium in a server data processing system may be downloaded over a network from the server to data processing system 200. The data processing system providing program code 218 may be a server computer, a client computer, or some other device capable of storing and transmitting program code 218.

In one or more examples, the data processing system 200 is the client computer that is used to test the security of a computer program product. In one or more examples, the computer program product is a web application, such as a host site, operating on a server computer, which also has an architecture as depicted by the data processing system 200. Alternatively, the computer program product being tested is a desktop application being executed on the client computer itself. The technical solutions herein generate application programming interface (API) requests to be tested, and then using a proxy, intercept the request to test and insert attacks into the request before sending the request to the computer program product.

In case the computer program product being tested is the web application, the technical solutions may use a browser (such as INTERNET EXPLORER™ FIREFOX™, CHROME™, etc.), for interacting with and sending requests to the web application. For example, the technical solutions herein generate HTTP requests to be tested using browser actions, and then using the proxy, intercept the request to test and insert attacks into it before sending the request to the server. From the browser's perspective there are no special parameters that are to be tracked, as the web application looks the same across sessions. Further, by using the browser to send the HTTP requests, the technical solutions facilitate flexibility regarding the method of HTTP playback. Accordingly, if one method of playback doesn't work a user can choose another playback method. Alternatively, or in addition, a user may use multiple different playback methods for automated HTTP playback, such as action based, browser automation (such as using tools like SELENIUM™), and/or scripting (such as using scripting tools like SIKULI™). In one or more examples, using the HTTP requests playback methods, such as the scripting, the technical solutions facilitate automating sequential flows through desktop applications (for example, which use HTTP REST APIs for network communication). Similarly, the technical solutions facilitate automating testing of Java Applets and ActiveX controls.

The technical solutions, thus, facilitate testing the computer program product such as a web application, which may include sequential flow that generates and/or displays multiple web pages without an (explicit) automated web crawling phase. The technical solutions, instead, use action-based sequences that are derived directly from instrumented interaction sessions, such as by a tester or a user. Further yet, in a multi-user setting, the technical solutions prioritize tests based on frequency/commonality of action-based sequences. In one or more examples, the technical solutions create reproduction scripts (using tools like COSCRIPTER™) by recording user actions in the browser when interacting with the web application. The scripts may be used for regression testing as part of the capabilities of the black-box tool. The scripted interaction with the web application, which may be operating on the server, is then tested for security vulnerabilities using the technical solutions described herein.

Figure 3:
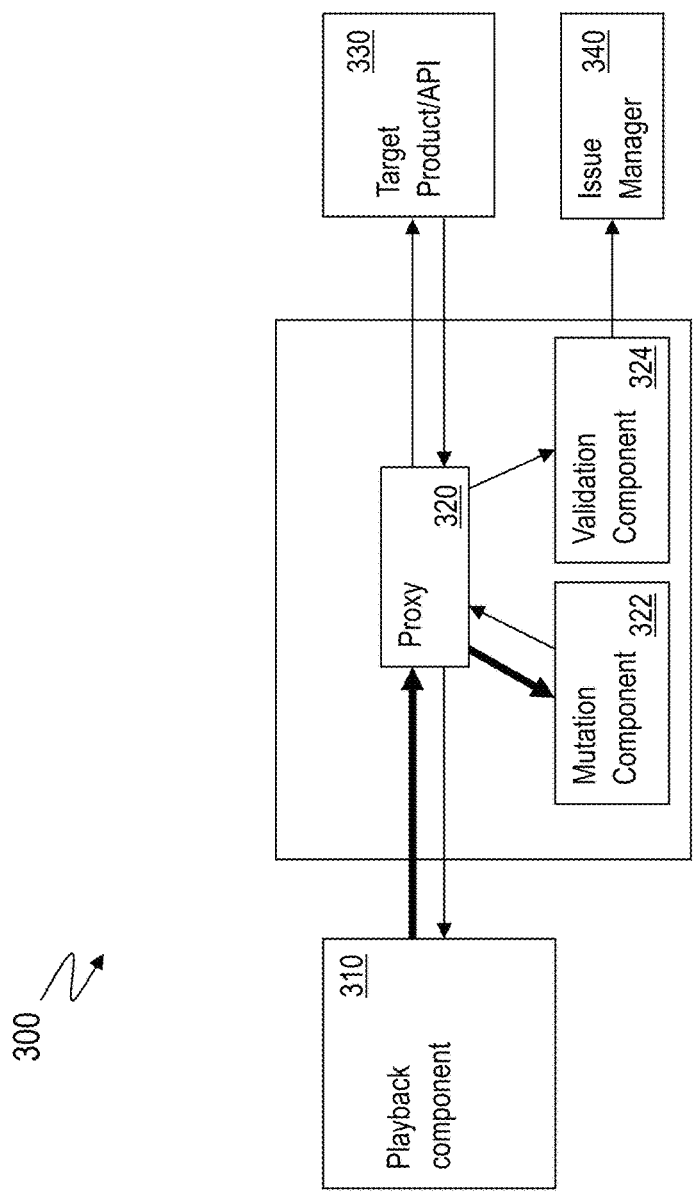
FIG. 3 illustrates an example view of a system for testing the security of a computer program product in accordance with one or more embodiments.

FIG. 3 illustrates an example view of a system 300 for testing security of a computer program product. Among other components, the system 300 includes a playback component 310, a proxy 320, a target computer program product 330, and an issue manager 340. The playback component is in charge of the generation of HTTP requests and communicates with the target computer program product 330 using the proxy 320. The playback component 310 may be any one of the examples described herein, such as the scripting tool. In one or more examples, the playback component 310 may be manually controlled to send HTTP requests for the target computer program product 330. Alternatively or in addition, the playback component 310 automatically sends HTTP requests for the target computer program product 330.

The target computer program product 330 is the application that is under test. In one or more examples, the target computer program product 330 may be a web application that is executing on a server computer, remote from a communication device on which the playback component 310 and/or the proxy 320 are being executed. In this regard, the target computer program product 330 may be referred to as a target system. Alternatively, the target computer program product 330, the playback component 310 and/or the proxy 320 may be executing on the same communication device, such as the data processing system 200.

The proxy 320 intercepts the HTTP request that the playback component 310 sends. In one or more examples, the proxy 320 includes a mutation component 322 and a validation component 324. It is understood that although the mutation component 322 and the validation component 324 are shown as part of the proxy 320 in FIG. 3, in other examples, the components may be separate and be associated with the proxy 320. The mutation component 322, in response to the proxy 320 receiving an HTTP request from the playback component 310, inserts a vulnerability attack into the HTTP request, thus creating a modified HTTP request. The proxy 320 subsequently relays the modified HTTP request to the target computer program product 330 and waits for a consequent response.

Upon receiving the response from the target computer program product 330, the proxy 320 passes the response to the validation component 324. The validation manager 324 determines if the response matches a predetermined response associated with the vulnerability attack inserted by the mutation component 322. For example, the mutation component 322 determines if the response includes a predetermined value of a parameter or a predetermined pattern.

If the response matches the predetermined response, the validation component 324 deems that the target computer program product 330 is susceptible to the vulnerability attack introduced by the mutation component 322. In such a case, the validation component 324 makes an entry in the issue manager 340. The entry may include the HTTP request that was originated by the playback component 310, the corresponding modified HTTP request from the mutation component 322, and the response received from the target computer program product 330. The entry may include different or additional data that facilitate determining the security vulnerability and securing the target computer program product 330. Thus, the validation component 324 logs an entry in the issue manager 340 in response to detecting a security vulnerability in the target computer program product 330 based on the reply from the target computer program product 330. In one or more examples, the proxy 320 does not forward the reply to the playback component 310 if the vulnerability is detected, causing the playback component 310 to restart the sequential flow. Alternatively, or in addition, the playback component 310 may initiate a different sequential flow that is associated with the event that the reply is not received. In one or more examples, the proxy 320 may relay the reply to the playback component 310 even if the vulnerability is detected to continue testing the further HTTP requests in the sequential flow that the playback component 310 continues to send.

If a security vulnerability is not detected, the reply from the target computer program product 330 is forwarded on to the playback component 310 by the proxy 320. The playback component 310 continues the predetermined sequential flow upon receipt of the reply.

As described earlier, the sequential flow may be a set of HTTP requests to facilitate a user to interact with the target computer program product 330. The sequential flow may include using data from a reply in a first step as input to a second step. For example, the sequential flow may be for creating an account, which may include receiving one or more inputs from the user on a first web-page, sending the input to the target computer program product 330, which in turn creates a second web-page based on the inputs. The second web-page is then displayed to the user, who may provide further input resulting in a third web-page, and so on. In one or more examples, the various steps in the sequential flow may occur across browsing sessions, for example, the session identifier input values for the same page may change across two different iterations of the same flow. It is understood that the account creation example above is just one of many sequential flow examples possible and that the technical solutions described herein are applicable to other examples as well.

Figure 4:
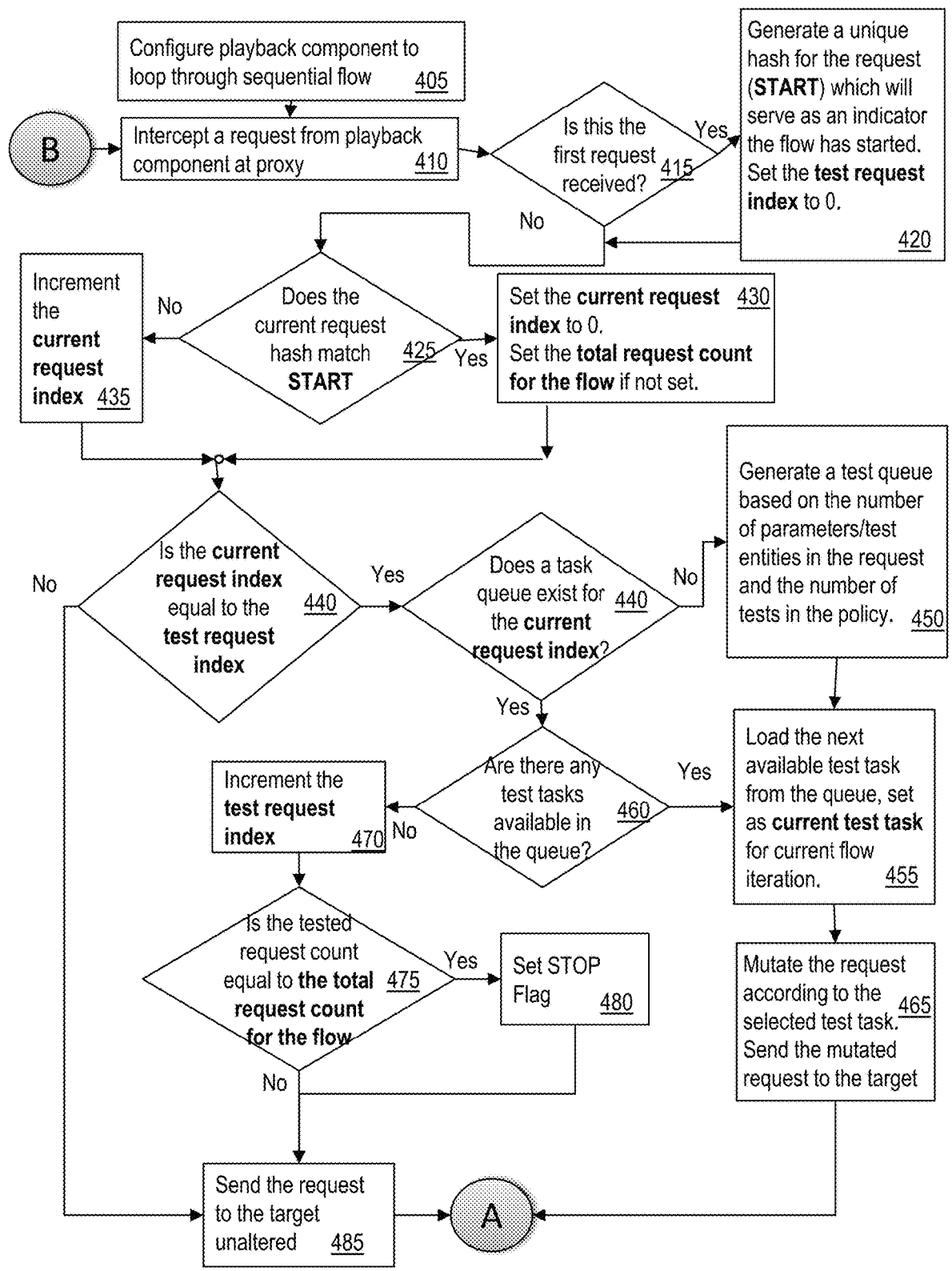
FIG. 4 illustrates part-1 of a flowchart of an example method for testing the security of the target computer program product in accordance with one or more embodiments.
Figure 5:
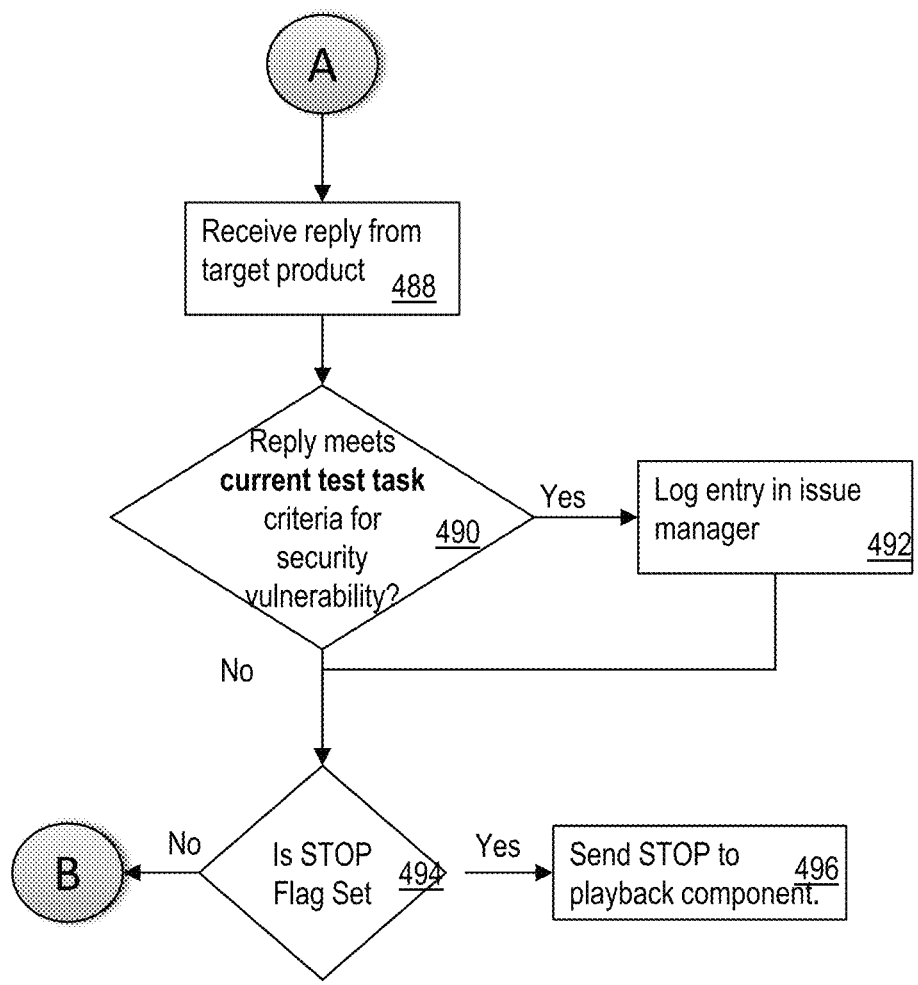
FIG. 5 illustrates part-2 of the flowchart of an example method for testing the security of the target computer program product in accordance with one or more embodiments.

FIGS. 4 and 5 illustrate a flowchart of an example method for testing the security of the target computer program product 330. The system 300 implements the method. In one or more examples, the playback component is configured to playback a sequential flow of the target computer program product 330 in a loop, as shown at 405. The sequential flow includes multiple requests that the playback component 310 sends for receipt by the target product 330 via the proxy 320.

Once a request comes in, the proxy 320 determines if the received request is a first request that the proxy 320 has intercepted, and if so, sets the request as a starting request of the sequential flow, as shown at 410 and 415. If the received instance is the starting request, the proxy 320 generates a unique identifier for the request, as shown at 420. The unique identifier is an indicator that the sequential flow playback has started. For example, the proxy 320 calculates a hash that uniquely identifies the request. The proxy 320 stores the identifier, such as the hash, for example in the storage device 216. Accordingly, based on the identifier, the proxy 320 can detect that the playback component 310 has started another iteration of the sequential flow upon intercepting a request that matches the unique identifier. The proxy 320 further keeps track of a test request index that facilitates determining which request from the sequential flow is being tested. In one or more examples, the proxy 320 initializes the test request index value to 0, as shown at 420.

Further, the proxy 320 compares the intercepted request from the playback component 310 with the identifier of the starting request, as shown at 425. If the intercepted request matches the identifier, which indicates that the playback component 310 has looped back to the starting request of the sequential flow, the proxy 320 sets a current request index to 0, as shown at 430. The current request index indicates which request from the sequential flow is currently being processed. Because the intercepted request matches the identifier of the starting request, the proxy 320 resets the current request index to 0. The proxy 320 also sets a total request count for the sequential flow, as shown at 430.

In case the intercepted request does not match the identifier of the starting request, the proxy 320 increments the current request index, as shown at 435. For example, if the intercepted request is the second request from the sequential flow, the second request does not match the identifier, and in this case, the current request index increments to 1, thus indicating that the second request is being processed. The current request index, thus, indicates which request from the sequential flow has currently been intercepted by the proxy 320.

The method further includes comparing the current request index and the test request index, as shown at 440. If the two indices match, it is indicative that the currently intercepted request is to be tested in this iteration of the sequential flow playback. That is the currently intercepted request is the current test request. Accordingly, the proxy 320 checks if a test queue for the current test request exists, as shown at 445. If the test queue does not exist, the proxy 320 generates the test queue, as shown at 450. The test queue includes a number of test tasks based on a number of parameters used by the current test request. For example, if the current test request includes one parameter, the proxy 320 generates test tasks for the single parameter; alternatively, if the current test request uses two parameters, the proxy 320 generates test tasks for two parameters; and so on. The proxy 320 may generate a predetermined number of tests for each parameter of the request. For example, if the proxy 320 generates two tests per parameter, and if the current test request includes two parameters, the proxy 320 generates four test tasks. In one or more examples, the proxy 320 includes a testing policy that indicates the predetermined number of tests per parameter. Alternatively, or in addition, the testing policy may include test tasks to be performed for the parameter based on the type of the parameter. Accordingly, the test queue may include the test tasks specified by the testing policy.

Once the test queue has been generated, the proxy 320 loads the next test task from the test queue for execution. The proxy 320 keeps track of which test tasks have been executed, and/or which have not been executed from the test queue. For example, the proxy 320 keeps track of the current test task for the ongoing iteration, as shown at 455.

In case the test queue for the current test request already exists, which is indicative that the current test request has been tested before, the proxy checks if the test queue has any test tasks that have not yet been executed, based on the current test task being tracked, as shown at 460. If there are additional test tasks that have not yet been tested, the proxy 320 selects the next available test task from the test queue and updates the current test task accordingly, as shown at 455.

Once selected, the proxy 320 informs the mutation component 322 of the selected test task and the current test request. The mutation component 322 modifies the current test request according to the selected test task, as shown at 465. For example, the mutation component 322 may set a value of the parameters in the current test-request to predetermined values according to the test task. The proxy 320 sends the mutated or modified current test request to the target computer program product 330, as shown at 465.

Alternatively, referring back to 460, if the proxy 320 determines that all of the test tasks from the test queue for the current test request have been executed, the proxy 320 increments the current test request index, thus selecting a next request from the selection flow as the current test request, as shown at 470. In case the current request count, after the increment, exceeds the total number of requests in the sequential flow, the proxy 320 issues a stop request to the playback component 310, such as by setting a stop flag for the playback component 310, as shown at 475 and 480. Thus, based on the two indices, the current test request and the current request index, the proxy 320 determines whether the instance of the currently intercepted request is currently being tested, and modifies (or not) the intercepted instance accordingly.

Referring back to 440, if the currently intercepted request is not the current test request, the proxy 320 relays the current request to the target computer program product 330, without any mutation, as shown at 485.

Thus, the proxy 320 forwards the current request to the target computer program product 330 with or without mutation, depending on whether the current request is the current test request. The proxy 320 receives a reply from the target computer program product 330 in response to the current test request. The proxy 320 sends the reply to the validation component 324, which detects if the reply meets predetermined criteria of a security vulnerability, as shown at 490. For example, if the current request was mutated, based on the mutation of the current test request, the validation component 324 checks if the reply matches a predetermined reply that indicates that the target computer program product 330 used the modified parameter values. If the reply indicates a vulnerability, the validation component 324 logs an entry in the issue manager 340, as shown at 492. The replies to the unmodified requests are also checked by the validation component 324 to determine if mutations in the current test request caused or exposed a vulnerability in any of the other requests in the sequential flow, as shown at 490. As described earlier, the validation component 324 logs an entry in the issue manager 340 in case a vulnerability is detected, as shown at 492. If the reply does not match a predetermined pattern, or predetermined criteria that is indicative of a security vulnerability, an entry is not registered in the issue manager 340.

If all the test requests in the sequential flow have been tested, which is indicative by the stop flag being set, the proxy 320 issues a stop request to the playback component 310, as shown at 494 and 496. Else, if there are additional request to be tested, the proxy 320 continues a next iteration by intercepting a next request from the playback component, as shown at 410. Thus, once all the test tasks for the current test request have been completed, the proxy 320 removes the current test request designation from the request, and in the next iteration of the loop, a different (second) request is designated as the current test-request. The loop continues until all requests in the sequential flow have been tested. After all requests in the sequential flow have been tested, the proxy 320 may shut down the playback component 310, or indicate to the playback component 310 to start a loop for a different sequential flow. Alternatively, or in addition, the proxy 320 may send a notification to a developer machine, or any other device, that testing the sequential flow has been completed. A developer may, for example, access the issue manager 340 to check the security vulnerabilities identified.

Figure 6:
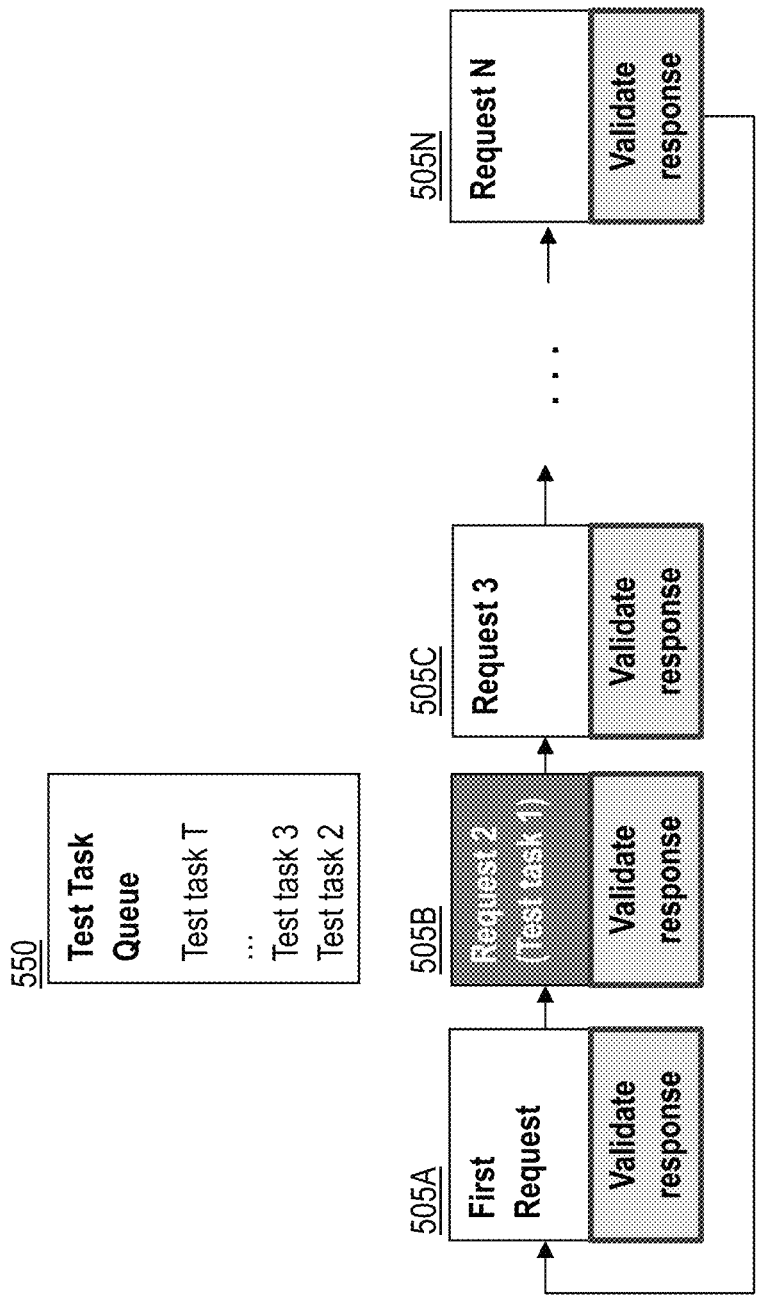
FIG. 6 depicts an example visualization of a test scenario in accordance with one or more embodiments.

FIG. 6 depicts an example visualization of a test scenario in which the sequential flow includes N requests 505A-505N. The second request (Request 2) 505B in FIG. 5 is the current test-request. The proxy 320 has generated a test task queue 550 including T test tasks, where T depends on the number of parameters used by the second request 505B. In this case, the first request 505A may have already been tested, by executing the sequential flow at least as many numbers of times as the test cases in a test task queue associated with the first request 505A. Once the T test tasks in the test task queue 550 that is associated with the second request 505B are all executed, the system 300 can continue to playback the sequential flow for executing test tasks for the third request (Request 3) 505C.

Accordingly, the technical solutions described herein facilitate testing a computer program product, and specifically a sequential flow of the computer program product that includes a sequence of requests. The technical solutions facilitate testing the sequential flow automatically by initializing a playback loop that sends the requests from the sequential flow. The requests are intercepted by a proxy, which generates test tasks for each request and tests each instance of the request with a respective test task. The technical solutions facilitate reusing existing QA automation, generated with tools such as SELENIUM™. Further yet, the technical solutions provide the flexibility of refraining from an (explicit) automated crawling phase to derive the sequential flows, and instead uses the playback loop to identify the requests and testing each request multiple numbers of times.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments described herein.

What is claimed is:

1. A computer implemented method for testing a computer program product, the method comprising:
    intercepting an instance of a request sent for execution by the computer program product, the request being one from a plurality of requests in a sequential flow;
    in response to the request being a first instance of a starting request of the sequential flow, storing a unique identifier for the request, and initializing a current test request index;
    in response to determining that the request is a current test-request based on an index of the request matching the current test request index, selecting a test task from a set of test tasks corresponding to the request, wherein the set of test tasks is generated based on a testing policy that indicates a predetermined number of tests per parameter and a number of parameters per request;
    modifying the instance of the request according to the selected test task; and
    sending the modified instance of the request to the computer program product for execution.

2. The computer implemented method of claim 1, further comprising:
    receiving, from the computer program product, a reply for the modified instance of the request; and
    in response to the reply matching a predetermined criteria, logging an entry indicative of a security vulnerability in the computer program product.

3. The computer implemented method of claim 2, wherein the entry identifies the request and the selected test task.

4. The computer implemented method of claim 1, further comprising:
    in response to the index of the request matching the current test request index, and the set of tasks not being generated, generating the set of test tasks for the request; and in response to the request being the current test-request, modifying the instance of the request.

5. The computer implemented method of claim 4, wherein the method further comprises, in response to the request not being the current test-request, sending the instance of the request to the computer program product without modification.

6. The computer implemented method of claim 1, further comprising:
sending the plurality of requests from the sequential flow for execution by the computer program product in a loop; and
in response to each of the parameters in the starting request being tested, designating a subsequent request from the sequential flow as a current test request by incrementing the current test request index.

7. A system for testing a computer program product, the system comprising:
a memory; and
a processor coupled with the memory, the processor configured to:
intercept an instance of a request sent for execution by the computer program product, the request being one from a plurality of requests in a sequential flow;
in response to the request being a first instance of a starting request of the sequential flow, store a unique identifier for the request, and initializing a current test request index;
in response to a determination that the request is a current test-request based on an index of the request matching the current test request index, select a test task from a set of test tasks corresponding to the request, wherein the set of test tasks is generated based on a testing policy that indicates a predetermined number of tests per parameter and a number of parameters per request
modify the instance of the request according to the selected test task; and
send the modified instance of the request to the computer program product for execution.

8. The system of claim 7, wherein the processor is further configured to:
receive, from the computer program product, a reply for the modified instance of the request; and
in response to the reply matching a predetermined criteria, log an entry indicative of a security vulnerability in the computer program product.

9. The system of claim 8, wherein the entry identifies the request and the selected test task.

10. The system of claim 7, wherein the processor is further configured to:
generate the set of test tasks for the request in response to the index of the request matching the current test request index and the set of tasks not being generated; and
in response to the request being the current test-request, modify the instance of the request.

11. The system of claim 7, wherein the processor is further configured to, in response to the request not being the current test-request, send the instance of the request to the computer program product without modification.

12. The system of claim 7, wherein the processor is further configured to:

send the plurality of requests from the sequential flow for execution by the computer program product in a loop; and
in response to each of the parameters in the starting request being tested, designate a subsequent request from the sequential flow as a current test request by incrementing the current test request index.

13. A computer program product for testing a target system, the computer program product comprising a computer readable storage medium, the computer readable storage medium comprising computer executable instructions, wherein the computer readable storage medium comprises instructions to:
intercept an instance of a request sent for execution by the computer program product, the request being one from a plurality of requests in a sequential flow;
in response to the request being a first instance of a starting request of the sequential flow, store a unique identifier for the request, and initializing a current test request index;
in response to a determination that the request is a current test-request based on an index of the request matching the current test request index, select a test task from a set of test tasks corresponding to the request, wherein the set of test tasks is generated based on a testing policy that indicates a predetermined number of tests per parameter and a number of parameters per request;
modify the instance of the request according to the selected test task; and
send the modified instance of the request to the computer program product for execution.

14. The computer program product of claim 13, wherein the computer readable storage medium further comprises instructions to:
receive, from the target system, a reply for the modified instance of the request; and
in response to the reply matching a predetermined criteria, log an entry indicative of a security vulnerability in the target system.

15. The computer program product of claim 14, wherein the entry identifies the request and the selected test task.

16. The computer program product of claim 13, wherein the computer readable storage medium further comprises instructions to:
generate the set of test tasks for the request in response to the index of the request matching the current test request index and the set of tasks not being generated; and
in response to the request being the current test-request, modify the instance of the request, and in response to the request not being the current test-request, send the instance of the request to the target system without modification.

17. The computer program product of claim 13, wherein computer readable storage medium further comprises instructions to:
send the plurality of requests from the sequential flow for execution by the computer program product in a loop; and
in response to each of the parameters in the starting request being tested, designate a subsequent request from the sequential flow as a current test request by incrementing the current test request index.

* * * * *